(12) United States Patent
Foerster et al.

(10) Patent No.: US 11,334,182 B2
(45) Date of Patent: *May 17, 2022

(54) SELECTION BIASING

(71) Applicant: Google LLC, Mountain View, CA (US)

(72) Inventors: Jakob Nicolaus Foerster, San Francisco, CA (US); Diego Melendo Casado, Mountain View, CA (US); Glen Shires, Danville, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,539

(22) Filed: Dec. 10, 2019

(65) Prior Publication Data
US 2020/0183569 A1 Jun. 11, 2020

Related U.S. Application Data

(63) Continuation of application No. 16/044,656, filed on Jul. 25, 2018, now Pat. No. 10,545,647, which is a
(Continued)

(51) Int. Cl.
*G06F 3/041* (2006.01)
*G06F 3/04842* (2022.01)
(Continued)

(52) U.S. Cl.
CPC .......... *G06F 3/0416* (2013.01); *G06F 3/0237* (2013.01); *G06F 3/0488* (2013.01);
(Continued)

(58) Field of Classification Search
CPC ...... G06F 3/0484; G06F 3/016; G06F 3/0488; G06F 3/041; G06F 17/28; G06F 17/27; G06F 40/58; G06F 40/274
See application file for complete search history.

(56) References Cited

U.S. PATENT DOCUMENTS 5,712,957 A * 1/1998 Waibel ..................... G06K 9/03
704/240
6,259,436 B1 7/2001 Moon et al.
(Continued)

FOREIGN PATENT DOCUMENTS

WO WO 2013/006215 1/2013

OTHER PUBLICATIONS

International Search Report and Written Opinion in International Application No. PCT/US2016/032834, dated Aug. 9, 2016, 10 pages.
(Continued)

*Primary Examiner* — William L Bashore
*Assistant Examiner* — Gregory A Distefano
(74) *Attorney, Agent, or Firm* — Honigman LLP; Brett A. Krueger; Grant Griffith

(57) ABSTRACT

In some implementations, data indicating a touch received on a proximity-sensitive display is received while the proximity-sensitive display is presenting one or more items. In one aspect, the techniques describe may involve a process for disambiguating touch selections of hypothesized items, such as text or graphical objects that have been generated based on input data, on a proximity-sensitive display. This process may allow a user to more easily select hypothesized items that the user may wish to correct, by determining whether a touch received through the proximity-sensitive display represents a selection of each hypothesized item based at least on a level of confidence that the hypothesized item accurately represents the input data.

18 Claims, 7 Drawing Sheets

Related U.S. Application Data continuation of application No. 14/739,853, filed on Jun. 15, 2015, now Pat. No. 10,048,842.

(51) Int. Cl.
| | |
|---|---|
| *G06F 3/04883* | (2022.01) |
| *G06F 3/16* | (2006.01) |
| *G06F 3/0488* | (2022.01) |
| *G06F 3/023* | (2006.01) |
| *G06F 40/58* | (2020.01) |
| *G06F 40/274* | (2020.01) |

(52) U.S. Cl.
CPC ...... *G06F 3/04842* (2013.01); *G06F 3/04883* (2013.01); *G06F 3/167* (2013.01); *G06F 40/274* (2020.01); *G06F 40/58* (2020.01)

(56) References Cited

U.S. PATENT DOCUMENTS

| | | | |
|---|---|---|---|
| 6,601,029 | B1 | 7/2003 | Pickering |
| 8,407,608 | B1* | 3/2013 | Franklin ............ G06F 3/04812 |
| | | | 715/759 |
| 8,413,037 | B2 | 4/2013 | Sayers |
| 8,494,852 | B2 | 7/2013 | Lebeau et al. |
| 10,564,770 | B1* | 2/2020 | Keeler ................ G06F 3/0418 |
| 2004/0049388 | A1 | 3/2004 | Roth |
| 2005/0049868 | A1 | 3/2005 | Busayapongchai |
| 2006/0293889 | A1* | 12/2006 | Kiss ........................ G10L 15/22 |
| | | | 704/235 |
| 2007/0152976 | A1 | 7/2007 | Townsend |
| 2007/0288240 | A1 | 12/2007 | Huang |
| 2008/0165133 | A1 | 7/2008 | Blumenberg |
| 2008/0212901 | A1 | 9/2008 | Castiglia |
| 2009/0006958 | A1* | 1/2009 | Pohjola ................. G06F 3/0488 |
| | | | 715/710 |
| 2009/0326938 | A1* | 12/2009 | Marila ..................... G10L 15/22 |
| | | | 704/235 |
| 2010/0250248 | A1 | 9/2010 | Willins |
| 2011/0043455 | A1* | 2/2011 | Roth ..................... G06F 3/0488 |
| | | | 345/173 |
| 2011/0166851 | A1 | 7/2011 | LeBeau |
| 2012/0144298 | A1* | 6/2012 | Karlsson ............ G06F 3/04842 |
| | | | 715/702 |
| 2012/0245936 | A1 | 9/2012 | Treglia |
| 2014/0104175 | A1 | 4/2014 | Ouyang et al. |
| 2014/0198047 | A1 | 7/2014 | Unruh et al. |
| 2014/0358519 | A1 | 12/2014 | Mirkin |
| 2015/0120274 | A1 | 4/2015 | Forbush |

OTHER PUBLICATIONS

International Preliminary Report on Patentability issued in International Application No. PCT/US2016/032834, dated Dec. 28, 2017, 7 pages.

\* cited by examiner

300

```
┌─────────────────────────────────────────────────────────────┐
│  PROVIDE A TEXT OBJECT FOR OUTPUT AT A FIRST LOCATION ON A  │
│               PROXIMITY-SENSITIVE DISPLAY                   │
│                                                         310 │
└─────────────────────────────────────────────────────────────┘
                              ↓
┌─────────────────────────────────────────────────────────────┐
│  RECEIVE DATA INDICATING A TOUCH RECEIVED AT A SECOND       │
│       LOCATION ON THE PROXIMITY-SENSITIVE DISPLAY           │
│                                                         320 │
└─────────────────────────────────────────────────────────────┘
                              ↓
┌─────────────────────────────────────────────────────────────┐
│  DETERMINE A CONFIDENCE VALUE THAT REFLECTS AN INPUT-TO-    │
│  TEXT ENGINE'S CONFIDENCE THAT TEXT ASSOCIATED WITH THE     │
│       TEXT OBJECT ACCURATELY REPRESENTS AN INPUT            │
│                                                         330 │
└─────────────────────────────────────────────────────────────┘
                              ↓
┌─────────────────────────────────────────────────────────────┐
│  DETERMINE WHETHER THE TOUCH RECEIVED THROUGH THE           │
│  PROXIMITY-SENSITIVE DISPLAY REPRESENTS A SELECTION OF      │
│                         THE TEXT                            │
│                                                         340 │
└─────────────────────────────────────────────────────────────┘
                              ↓
┌─────────────────────────────────────────────────────────────┐
│  PROVIDE AN INDICATION OF WHETHER THE TOUCH RECEIVED        │
│  THROUGH THE PROXIMITY-SENSITIVE DISPLAY REPRESENTS A       │
│                   SELECTION OF THE TEXT                     │
│                                                         350 │
└─────────────────────────────────────────────────────────────┘
```

FIG. 3

SELECTION BIASING

CROSS-REFERENCE TO RELATED APPLICATION

This application is a continuation application of U.S. application Ser. No. 16/044,656, filed Jul. 25, 2018, which is a continuation application of U.S. application Ser. No. 14/739,853, filed Jun. 15, 2015, which are incorporated by reference.

TECHNICAL FIELD

This disclosure generally relates to user interfaces, and one particular implementation relates to selecting an item presented by a user interface.

BACKGROUND

Transcription of speech input is an increasingly popular way of inputting information into a computing device. This is even truer for mobile computing devices, such as mobile telephones, smartphones, and wearable devices, where the interfaces available to the user for making user inputs are not as easy to manipulate as user interfaces in a desktop computer, such as a full-size keyboard and mouse. For example, some mobile computing devices employ a graphical user interface ("GUI") on a touch screen. Typically, these user input interfaces are much smaller than traditional desktop user interfaces and can therefore pose difficulties to users who may want to interact with displayed items.

SUMMARY

In general, an aspect of the subject matter described in this specification may involve a process for disambiguating touch selections of hypothesized items, such as text or graphical objects that have been generated based on input data, on a proximity-sensitive display. This process may allow a user to more easily select hypothesized items that the user may wish to correct, by determining whether a touch received through the proximity-sensitive display represents a selection of each hypothesized item based at least on a level of confidence that the hypothesized item accurately represents the input data.

In some aspects, the subject matter described in this specification may be embodied in methods that may include the actions of providing an item for output at a first location on a proximity-sensitive display, receiving data indicating a touch received at a second location on the proximity-sensitive display, determining a confidence value that reflects a mapping engine's confidence that the item accurately represents an input, determining whether the touch received through the proximity-sensitive display represents a selection of the item based at least on (i) the confidence value that reflects the mapping engine's confidence that the item is an accurate representation of the input, (ii) the first location of the item on the proximity-sensitive display, and (iii) the second location of the touch on the proximity-sensitive display, and providing an indication of whether the touch received through the proximity-sensitive display represents a selection of the item.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For instance, implementations may include providing another item for output at a third location on the proximity-sensitive display and determining a confidence value that reflects the mapping engine's confidence that the other item accurately represents another input. In these implementations, determining whether the touch received through the proximity-sensitive display represents a selection of the item based at least on (i) the confidence value that reflects the mapping engine's confidence that the item is an accurate representation of the input, (ii) the first location of the item on the proximity-sensitive display, and (iii) the second location of the touch on the proximity-sensitive display, may include determining whether the touch received through the proximity-sensitive display represents a selection of the item based at least on (i) the confidence value that reflects the mapping engine's confidence that the item is an accurate representation of the input, (ii) the first location of the item on the proximity-sensitive display, (iii) the second location of the touch on the proximity-sensitive display, (iv) the confidence value that reflects the mapping engine's confidence that the other item is an accurate representation of the other input, and (v) the third location of the other item on the proximity-sensitive display.

In some aspects, the subject matter described in this specification may be embodied in methods that may also include the actions of providing a text object for output at a first location on a proximity-sensitive display, receiving data indicating a touch received at a second location on the proximity-sensitive display, determining a confidence value that reflects an input-to-text engine's confidence that text associated with the text object accurately represents an input, determining whether the touch received through the proximity-sensitive display represents a selection of the text based at least on (i) the confidence value that reflects the input-to-text engine's confidence that the text is an accurate representation of the input, (ii) the first location of the text object on the proximity-sensitive display, and (iii) the second location of the touch on the proximity-sensitive display, and providing an indication of whether the touch received through the proximity-sensitive display represents a selection of the text.

In some implementations, actions may further include receiving, by the input-to-text engine, input, generating, by the input-to-text engine, text based on the received input. In these implementations, determining the confidence value that reflects the input-to-text engine's confidence that text associated with the text object accurately represents an input may include determining a confidence value that reflects the input-to-text engine's confidence that the generated text accurately represents the received input.

In some examples, receiving, by the input-to-text engine, input may include receiving, by the input-to-text engine, at least one image of a document and determining the confidence value that reflects the input-to-text engine's confidence that the generated text accurately represents the received input may include determining a confidence value that reflects the input-to-text engine's confidence that the generated text accurately represents one or more textual characters included in the document.

In some implementations, receiving, by the input-to-text engine, input may include receiving, by the input-to-text engine, audio data that encodes an utterance and determining the confidence value that reflects the input-to-text engine's confidence that the generated text accurately represents the received input may include determining a confidence value that reflects the input-to-text engine's confidence that the generated text accurately represents one or more terms spoken in the utterance.

In some implementations, receiving, by the input-to-text engine, input may include receiving, by the input-to-text engine, text in a first language and generating, by the input-to-text engine, text based on the received input may include generating, by the input-to-text engine, text in a second language based on the received text in the first language. In addition, determining the confidence value that reflects the input-to-text engine's confidence that the generated text accurately represents the received input may include determining a confidence value that reflects the input-to-text engine's confidence that the generated text is an accurate translation of the received text.

In some examples, the actions may further include determining a distance between the first location and the second location. In these implementations, determining whether the touch received through the proximity-sensitive display represents a selection of the text based at least on (i) the confidence value that reflects the input-to-text engine's confidence that the text is an accurate representation of the input, (ii) the first location of the text object on the proximity-sensitive display, and (iii) the second location of the touch on the proximity-sensitive display, may include determining whether the touch received through the proximity-sensitive display represents a selection of the text based at least on (i) the confidence value that reflects the input-to-text engine's confidence that the text is an accurate representation of the input, (ii) the distance between the first location and the second location.

In some implementations, the actions may further include providing another text object for output at a third location on a proximity-sensitive display and determining a confidence value that reflects an input-to-text engine's confidence that text associated with the other text object accurately represents another input. In addition, determining whether the touch received through the proximity-sensitive display represents a selection of the text based at least on (i) the confidence value that reflects the input-to-text engine's confidence that the text is an accurate representation of the input, (ii) the first location of the text object on the proximity-sensitive display, and (iii) the second location of the touch on the proximity-sensitive display, may include determining whether the touch received through the proximity-sensitive display represents a selection of the text based at least on (i) the confidence value that reflects the input-to-text engine's confidence that the text is an accurate representation of the input, (ii) the first location of the text object on the proximity-sensitive display, (iii) the second location of the touch on the proximity-sensitive display, (iv) the confidence value that reflects the input-to-text engine's confidence that the other text is an accurate representation of the other input, and (v) the third location of the other text object on the proximity-sensitive display.

In some implementations, determining whether the touch received through the proximity-sensitive display represents a selection of the text based at least on (i) the confidence value that reflects the input-to-text engine's confidence that the text is an accurate representation of the input, (ii) the first location of the text object on the proximity-sensitive display, and (iii) the second location of the touch on the proximity-sensitive display may include determining that the touch received through the proximity-sensitive display represents a selection of the text based at least on (i) the confidence value that reflects the input-to-text engine's confidence that the text is an accurate representation of the input, (ii) the first location of the text object on the proximity-sensitive display, and (iii) the second location of the touch on the proximity-sensitive display. In these implementations, a further action may performed in response to determining that the touch received through the proximity-sensitive display represents a selection of the item. An example of such a further action may include expanding selection to one or more adjacent text objects based on one or more confidence values that reflect the input-to-text engine's confidence that text associated with each adjacent text object accurately represents its corresponding input.

In some implementations, determining whether the touch received through the proximity-sensitive display represents a selection of the text based at least on (i) the confidence value that reflects the input-to-text engine's confidence that the text is an accurate representation of the input, (ii) the first location of the text object on the proximity-sensitive display, and (iii) the second location of the touch on the proximity-sensitive display may include determining that the touch received through the proximity-sensitive display does not represent a selection of the text based at least on (i) the confidence value that reflects the input-to-text engine's confidence that the text is an accurate representation of the input, (ii) the first location of the text object on the proximity-sensitive display, and (iii) the second location of the touch on the proximity-sensitive display. In these implementations, a further action may performed in response to determining that the touch received through the proximity-sensitive display represents a selection of the item.

In some examples, the first location of the text object on the proximity-sensitive display corresponds to a location of the text object's centroid on the proximity-sensitive display. In other examples, the first location of the text object on the proximity-sensitive display corresponds to a location of a portion of the text object's bounding box on the proximity-sensitive display.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 3 is a flowchart of an example process for disambiguating touch selections of hypothesized items on a proximity-sensitive display.

Like reference symbols in the various drawings indicate like elements.

DETAILED DESCRIPTION

Figure 1:
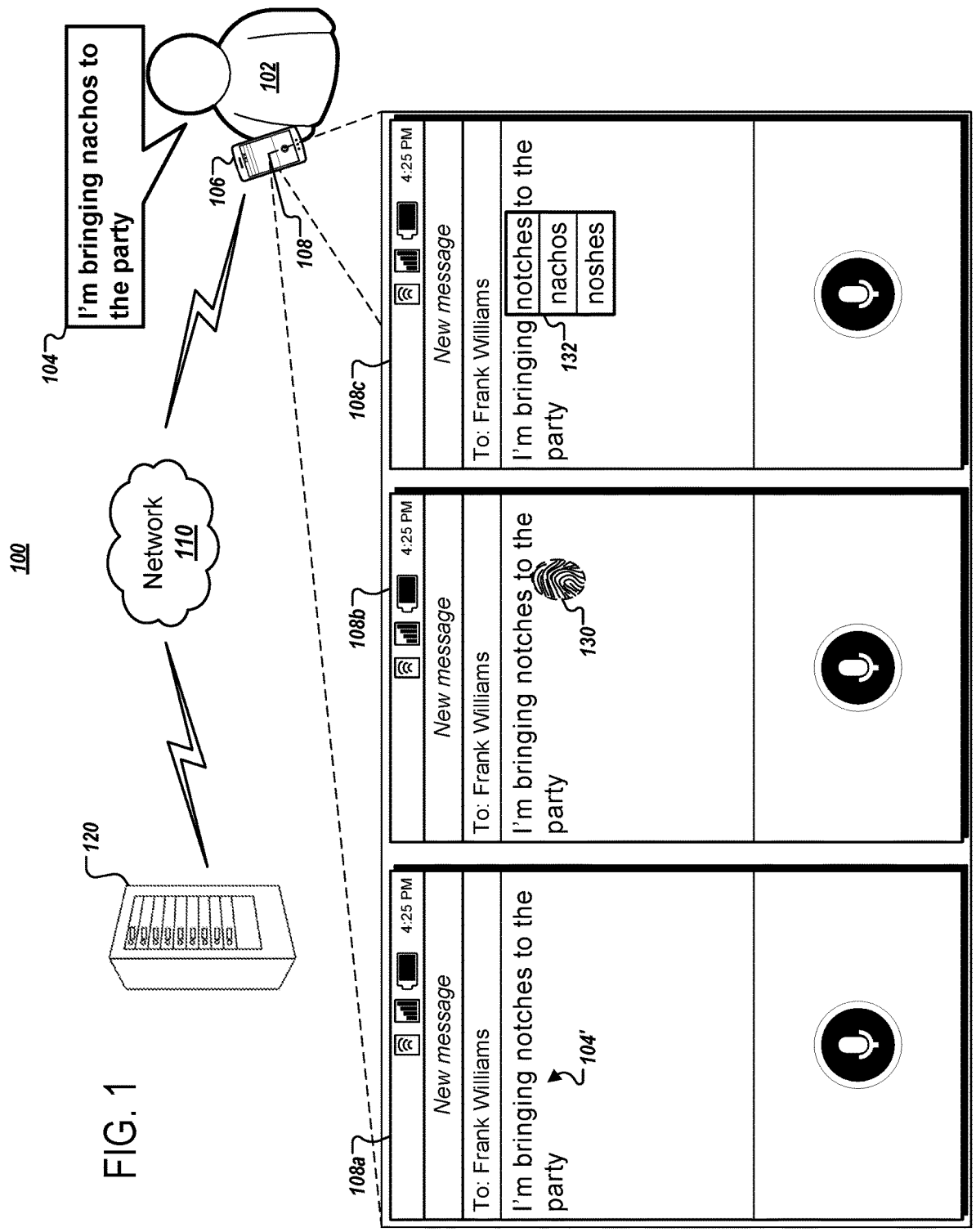
FIG. 1 is a conceptual diagram of an exemplary framework for disambiguating touch selections of hypothesized items on a proximity-sensitive display.

FIG. 1 is a conceptual diagram of an exemplary framework for disambiguating touch selections of hypothesized items on a proximity-sensitive display in a system 100. More particularly, the diagram depicts a user device 106 in communication with a computing device 120 over a network 110, that collectively make up system 100. The diagram also depicts both a screen 108 that is displayed by a touch screen of the user device 106 in various stages, labeled as form 108a to 108c, in time-sequenced stages "A" to "C," respectively. Briefly, and as described in further detail below, the user device 106 may receive input 104 and display hypothesized items 104' that represent data included in input 104.

In this example, the input 104 includes an utterance of words spoken by the user 102 and the hypothesized items 104' include transcribed text for the utterance. The screen 108 may correspond to a text-input interface provided by an email application that the user 102 has accessed to compose a message. In the example of FIG. 1, the user 102 utilizes a speech-to-text function to compose an email message to a friend, "Frank Williams."

For instance, the user 102 might say "I'm bringing nachos to the party." As user 102 speaks, the user device 106 may, in real-time, record the user's utterance 104 and provide the recorded audio data to a speech recognizer. The speech recognizer, which may be executed locally by the user device 102 or remotely by the computing device 120, may produce a word lattice for the recorded utterance.

In addition, the speech recognizer may indicate which of the words it considers most likely to be accurate representations of the utterance of words spoken by the user 102, for example, by providing confidence scores and/or rankings for both individual words and series of words. The speech recognizer's confidence in the match between the speech data and each word may be based on how well the word fits grammatically and/or lexically with other words in the word lattice. Words may be selected for the transcription of speech data based on these confidence values.

In this example, "I'm bringing notches to the party" may be selected for the transcription of the user's utterance 104. This selection may, for instance, be performed locally by the user device 102 or remotely by the computing device 120. In stage A, the user device 106 may display screen 108a that indicates the transcription of the user's utterance 104 with text objects 104'. Text objects 104' include text objects associated with each of the hypothesized words "I'm," "bringing," "notches," "to," "the," and "party."

In stage B, the user device 106 may display screen 108b and the user 102 may provide the touch screen of the user device 106 with touch input 130. The user 102 may, for example, provide the touch input 130 at a location on the touch screen of user device 106 that corresponds to one of the text objects 104'. Such input may indicate selection of one of the text objects 104' of transcription provided for utterance 104. In some examples, the user may, in response to such selection, be provided with an opportunity to correct or otherwise modify selected items.

Upon receiving touch input 130, the user device 106 may determine whether the touch received through its touch screen represents a selection of one of the text objects 104' and, if so, which of the text objects 104' are to be selected. This determination may be on the basis of the location on the touch screen of user device 106 at which touch input 130 was received, as well as the locations on the touch screen of user device 106 at which each of the text objects 104' is displayed and confidence values that reflect the speech recognizer's confidence that the hypothesized words of each of the text objects 104' accurately represent words spoken by the user 102 in utterance 104. These confidence values may, for example, be those which were described above in reference to selecting words from the word lattice produced by the speech recognizer.

In some implementations, a selection score may be determined for each of text objects 104' based on the locations and confidence scores described above. In these implementations, the user device 106 may determine whether the touch received through its touch screen represents a selection of one of the text objects 104' based at least on the selection scores determined for the text objects 104'. The user device 106 may, for example, determine that the touch received represents a selection of a text object having a relatively high selection score.

In some implementations, the distance between the location of touch input 130 and the location of each of text objects 104' may be considered in such a determination. The user device 106 may, for instance, seek to select text objects that are located relatively close to the location of touch input 130.

In the example of FIG. 1, it can be seen that, of the text objects 104', the text object that is associated with the hypothesized word "to" is the closest text object to the location on the touch screen of user device 106 at which touch input 130 was received. For at least this reason, the distance between the text object that is associated with the hypothesized word "to" may have more favorable influence on selection score than that of others of the text objects 104'.

The user device 106 may, in some implementations, also seek to select the text objects that are associated with relatively low confidence values. This may be advantageous for situations in which user 102 is provided with an opportunity to correct or otherwise modify selected items.

The speech recognizer may, for example, have relatively little confidence in the text object that is associated with the hypothesized word "notches" accurately representing one or more words spoken by the user 102 in utterance 104. That is, although the speech recognizer may have considered "notches" to most likely represent a corresponding portion of utterance 104, it is not as confident in it accuracy as it may be for the text objects that are associated with each of the hypothesized words "I'm," "bringing," "to," "the," and "party," respectively. For at least this reason, the confidence value determined for the hypothesized word "notches" may have more favorable influence on the selection score of the text object associated with the hypothesized word "notches" than that of hypothesized words associated with others of the text objects 104'.

In the example of FIG. 1, the user device 106 may determine that the touch input 130 received through the touch screen of user device 106 represents a selection of the hypothesized word "notches." This particular item may, for instance, have been selected because it had the greatest selection score of all of the text objects 104'. Although the text object that is associated with the hypothesized word "to" may be located closer to the location of the touch input 130 than the text object that is associated with the hypothesized word "notches" is, its confidence value may have been disproportionately higher.

In stage C, the user device 106 may display screen 108b that provides indication that the touch input 130 received through the touch screen of user device 106 represents a selection of the hypothesized word "notches." This indication may, for example, come in the form of a list 132 of alternate words from the word lattice for the selected word "notches."

The list 132 may provide the user 102 with an opportunity to replace the selected word with one of the alternate words provided. The list 132 includes the alternates "nachos" and "noshes," which may have been the speech recognizer's second and third choices to represent the corresponding portion of utterance 104.

For example, the user 102 may provide additional input to select the word "nachos" as a replacement for the hypothesized word "notches." In this way, the user 102 is able to correct the transcription provided by the speech recognizer so that, as intended, the draft email reads "I'm bringing nachos to the party."

In some implementations, the user device 106 is a mobile telephone, smartphone, or wearable device, and includes a limited user input interface, such as a small QWERTY hardware keyboard, a small touchscreen, or a numeric keypad. The user device 106 accesses the network 110 using a wireless connection, such as a cellular telephone data connection, a Wi-Fi connection, or other wireless connection that can be used for sending data to and receiving data from the computing device 120.

In some implementations, the network 110 includes one or more networks, such as a local area network, a wide area network, and/or the Internet. One or more of the networks in the network 110 may be wireless, such as a cellular telephone network or a Wi-Fi network.

The computing device 120 may include the speech recognizer that transcribes the speech data output into the word lattice. In general, the word lattice includes multiple hypotheses for the transcription of the speech data output. In some implementations, the word lattice includes one or more weighting factors or probabilities, such as confidence values, that a particular word occurs at a particular location in the transcribed text.

Each hypothesis for the transcription of the utterance represents a possible path through the word lattice. In some implementations, branch points from one word to the next in a hypothesis depend on the other words in the hypothesis. For example, a particular word in the word lattice may have multiple weights or probabilities that depend upon the other words included in the hypothesis. In addition, the word lattice may include all of the possible hypotheses for the set of words included in the word lattice or a subset of the most probable combinations of words from the word lattice. The user device 106 selects the most probable path through the word lattice and presents that hypothesis to the user 102.

Figure 2:
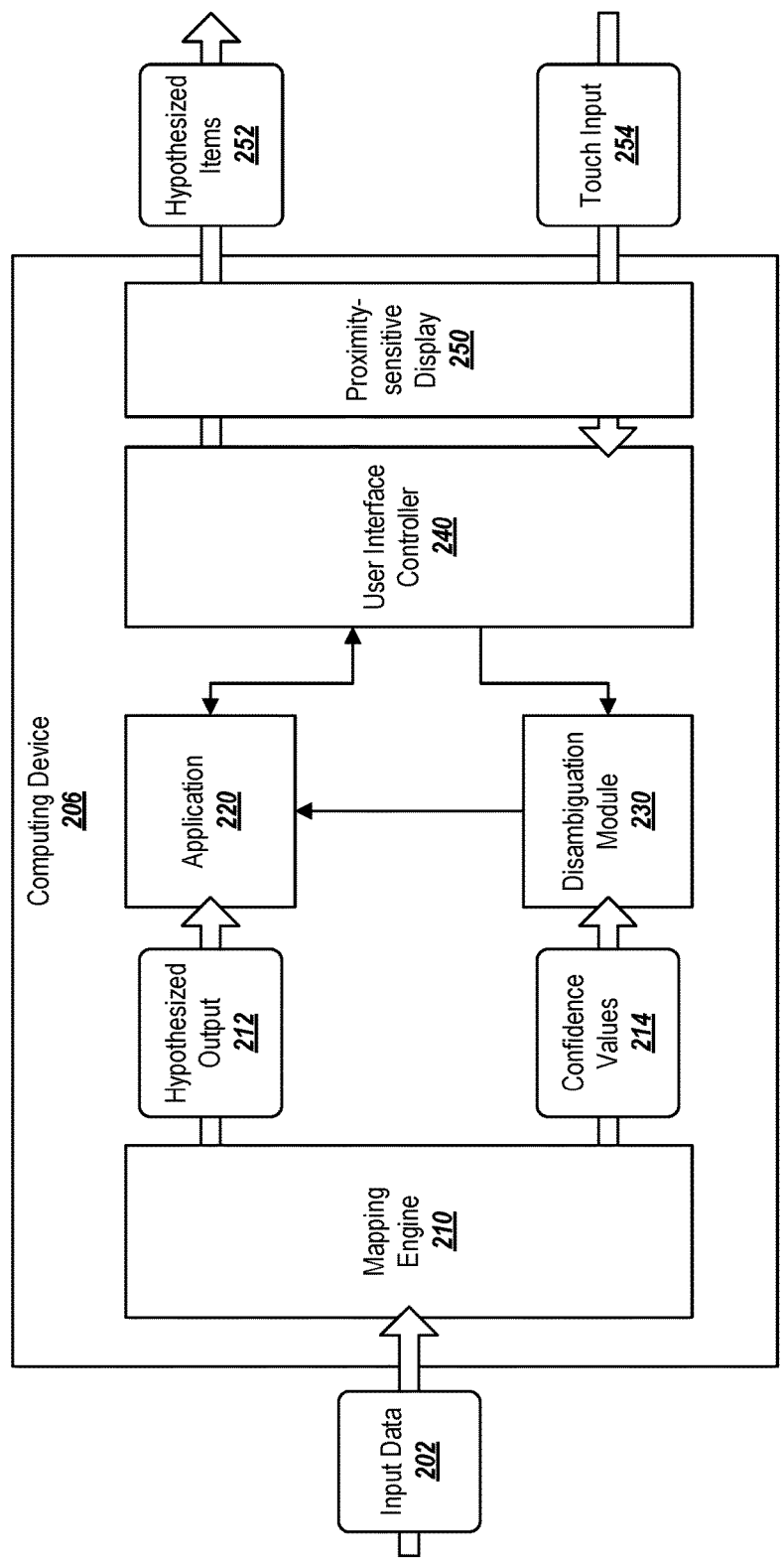
FIG. 2 is a diagram of an exemplary system for disambiguating touch selections of hypothesized items on a proximity-sensitive display.

FIG. 2 depicts an exemplary system 200 for disambiguating touch selections of hypothesized items on a proximity-sensitive display. More particularly, FIG. 2 depicts a computing device 206 that includes mapping engine 210, application 220, disambiguation module 230, user interface controller 240, and proximity-sensitive display 250. Although depicted as a singular system, the architecture of computing device 206 may be implemented using one or more networked computing devices. In some implementations, system 200 may be utilized to execute the processes described above in association with FIG. 1.

The mapping engine 210 may be a module that receives input, maps the received input to a set of corresponding data, and generates an output that includes the set of corresponding data. The set of data output by the mapping engine 210 may be an alternative representation of the received input.

The mapping engine 210 can be seen as a module that maps data from a first semiotic sign system to a second semiotic sign system.

In the example depicted in FIG. 2, the mapping engine 210 receives input data 202. The mapping engine 210 may determine, with a degree of confidence, that the received input data 202 most likely maps to a particular set of data. Upon making this determination, the mapping engine 210 may generate hypothesized output 212 that includes the particular set of data and one or more confidence values 214 that indicate the mapping engine's confidence that the hypothesized output 212 accurately represents input data 202. That is, the information output by mapping engine 212 may be the results of one or more inferential processes performed by mapping engine 212.

The mapping engine 210 may, for instance, be that which performs one or more of a recognition process, a translation process, or any other process involving interpretation of input data and generation of corresponding output data that has been determined to best represent the input data. For example, the mapping engine 210 may perform speech recognition processes.

In this example, the mapping engine 210 may be a speech recognizer such as that which has been described above in reference to FIG. 1. As such, the input data 202 provided to the mapping engine 210 may include recorded audio data of an utterance. The hypothesized output 212, to which the mapping engine 212 maps recorded audio data of an utterance, may include a transcription for the utterance. In this example, audible speech may be considered to be the semiotic system of the input data 202 and text may be considered to be semiotic system of the hypothesized output 212. Other implementations of the mapping engine 210 may include an image recognition engine that maps image data to data that identifies referents (e.g., objects, faces, locations, etc.) of the image data, a gesture recognition engine, a handwriting recognition engine, an optical character recognition ("OCR") engine, a machine translation engine, and the like.

The hypothesized output 212 may be provided to an application 220 that is running on computing device 206. Application 220 may be any of a variety of software components that provide an interface that displays a representations of input data 202. In the example of FIG. 1, the email application with which the user 102 interacts may constitute as such an application 220.

In response to receiving hypothesized output 212, the application may provide hypothesized items 252 to a user interface controller 240 to be displayed on proximity-sensitive display 250. Hypothesized items 252, which may include graphics, text, and other dot-matrix objects, can be seen as one or more versions of hypothesized output 212 that have been formatted for display on proximity-sensitive display 250. In some examples, hypothesized items 252 may be provided to a user in the form of haptic stimuli.

The user interface controller 240 and proximity-sensitive display 250 may display hypothesized items 252 and other content associated with application 220. In addition, the user interface controller 240 and proximity-sensitive display 250 may receive user input. In some implementations, the proximity-sensitive display 250 may be a touch screen. In these implementations, touch input 254 may be provided as user input to computing device 206.

A disambiguation module 230 may receive confidence values 214 and touch input 254 and provide information that indicates whether touch input 254 received through the proximity-sensitive display 250 represents a selection of any of the hypothesized items 252. The confidence values 214 may be determined by mapping engine 210 on the basis of a variety of factors, such as user information, geographical location of the computing device 206, user input, and the like. User information may, for example, include information about a user's social network, social actions or activities, profession, a user's preferences, historical usage information, and the like.

For example, a speech recognizer may assign a higher confidence value to the transcribed word "borscht" when a user of computing device 206 is in Ukraine than it would when the user of computing device 206 is in Argentina. In some examples, confidence value determination processes may be refined and improved using machine learning techniques.

For situations in which the systems discussed herein collect personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, zip code, or state level, so that a particular location of a user cannot be determined. Thus, the user may have control over how information is collected about him or her and used by a content server.

In some implementations, the disambiguation module 230 may receive information that indicates the different locations at which hypothesized items 252 are displayed on the proximity-sensitive display 250. The disambiguation module 230 may perform disambiguation processes similar to those which have been described above in association with FIG. 1 that take one or more of confidence values 214 and locations of hypothesized items 252 and touch input 254 on the proximity-sensitive display 250. The application 220 may, in some examples, provide an indication of whether the touch input 254 received through the proximity-sensitive display 250 represents a selection of one of the hypothesized items 252.

Such indication may, for instance, include a menu of alternative hypothesized items, a highlighting of the selection, audible notification, visual notification, and the like. In some implementations, the application 220 may automatically replace or change a selected hypothesized item in response to being informed by the disambiguation module 230 of its selection. A selection may also trigger the execution of one or more additional functions performed by mapping engine 210, such as an additional and more extensive mapping process which may yield more accurate results.

As mentioned above, mapping engine 210 may perform image recognition processes. In these implementations, input data 202 may include one or more images. In one example, mapping engine 210 may be a facial recognition engine that maps image data 202 to names of individuals whose faces.

In this example, the proximity-sensitive display 250 may display an image from image data 202 and hypothesized items 252 as graphics superimposed onto the image. Such hypothesized items 252 may include graphical tags that are positioned over each person's face in the image that indicate their hypothesized identity. Selection of one of the tags 252 may allow a user to correct an incorrectly-identified face in an image. In similar implementations, image processing techniques may be applied by mapping engine 210 to recognize objects, biometrics, and other image data referents.

In another example, mapping engine 210 may perform gesture recognition processes. In this example, input data 202 may include data provided by a sensor, such as an imaging device, proximity-sensitive display, virtual keyboard interface, or accelerometer that indicates a gesture being performed by a user of computing device 206.

In some implementations, gestures may be mapped to transcribed text. These implementations may allow a deaf or hard of hearing user to easily compose messages with gestures in a manner comparable to that which has been described above in reference to the speech recognition techniques of FIG. 1. Various gestures and non-verbal signs may be mapped to graphical and textual objects in these implementations.

As mentioned above, mapping engine 210 may perform optical character recognition processes. In these implementations, input data 202 may include image data such as images of one or more typed or handwritten documents. For example, input data 202 may be that which is included in a portable document format ("PDF") file.

The mapping engine 210 may be an OCR engine that maps images to textual characters. In some examples, the OCR engine 210 may provide transcriptions for referent text of the image data 202. In examples where image data 202 include an image of handwritten text, the OCR engine 210 may map handwriting to an individual that the OCR engine 210 considers to be the scribe of referent text of the image data 202.

In another example, mapping engine 210 may perform language translation processes. In this example, input data 202 may include one or more words in a first language. The mapping engine 210 may be a machine translation engine that maps one or more words received in the first language to corresponding one or more words in a second language.

For example, input data 202 may indicate the words "Bonjour Peter" in the French language. The machine translation engine 210 may, for example, map "Bonjour Peter" in the French language to "Hi Peter" in the English language and output text items that are associated with hypothesized translated text "Hi" and "Peter." Upon receiving touch input from a user, the disambiguation module 230 may at least rely upon the locations of the displayed text objects and the machine translation engine's confidence that the hypothesized translated text that is associated with each text object accurately represent "Bonjour" and "Peter" in the English language.

While a few examples of processes executed by mapping engine 210 have been described, it is to be understood that mapping engine 210 may be implemented to perform any type of semiotic sign system translation or conversion process. It is to be further understood that input data 202 may be provided to mapping engine 210 from one or more of a variety of sources.

For instance, input data 202 may be provided to mapping engine 210 from another application running on computing device 206, the Internet, a user interface, one or more peripheral devices, one or more sensors or transducers onboard the computing device 206, one or more other devices in communication with computing device 206, or a combination thereof. In addition, mapping engine 210 may rely upon one or more remotely-located devices such as servers, databases, and/or cloud computing devices to perform at least a portion of its functions as described herein.

FIG. 3 is a flowchart of an example process 300 for disambiguating touch selections of hypothesized items on a proximity-sensitive display. The following describes the process 300 as being performed by components of systems that are described with reference to FIGS. 1 and 2. However, process 300 may be performed by other systems or system configurations.

For example, consider a mobile device that receives data that reflects an utterance of one or more words spoken by a user, and that uses speech recognition functionality to provide a transcription of the words spoken by the user for display. If the user were to discover an error in the displayed transcription, they might touch a word or words as displayed by a touch screen of the mobile device. Although the user may not touch the precise location at which the word or number of words are displayed on the touch screen, the mobile device may automatically select the word or number of words that the user wishes to correct. Responsive to the selection, the mobile device may provide the user with an opportunity to replace the selected word or number of words with one or more alternative transcriptions.

At 310, the process 300 may include providing an item, such as a text object, for output at a first location on a proximity-sensitive display. In the example of FIG. 1, a text object may correspond to one of text objects 104' that is displayed on screen 108.

At 320, the process 300 may include receiving data indicating a touch received at a second location on the proximity-sensitive display. For example, data indicating a touch may be provided to an application or disambiguation module by a proximity-sensitive display or user interface controller in response to touch input provided by a user.

At 330, the process 300 may include determining a confidence value that reflects a mapping engine's confidence that text associated with the text object accurately represents an input. In some implementations, the mapping engine may be an input-to-text engine that generates transcribed text as its hypothesized output.

Such confidence value may be that which was utilized by a mapping engine when determining that received input most likely corresponds to the hypothesized output. As described above, the confidence value may be determined using one or more processes that are tailored to the application of the mapping engine and indicate the mapping engine's confidence that, by its output, it has correctly recognized, identified, translated, converted, or otherwise mapped the received input.

At 340, the process 300 may include determining whether the touch received through the proximity-sensitive display represents a selection of the text. This determination may, for example, be performed based on the confidence value that reflects the input-to-text engine's confidence that the text is an accurate representation of the input, the first location of the text object on the proximity-sensitive display, and the second location of the touch on the proximity-sensitive display. For example, this may be performed by disambiguation module 230 as described above in reference to FIG. 2. Results of such determination may be provided to an application which, in response to the determination, will execute one or more processes in accordance with the selection.

In some implementations, the process 300 may further include determining a distance between the first location and the second location. In these implementations, determining whether the touch received through the proximity-sensitive display represents a selection of the text based at least on (i) the confidence value that reflects the input-to-text engine's confidence that the text is an accurate representation of the input, (ii) the first location of the text object on the proximity-sensitive display, and (iii) the second location of the touch on the proximity-sensitive display, may further include determining whether the touch received through the proximity-sensitive display represents a selection of the text based at least on (i) the confidence value that reflects the input-to-text engine's confidence that the text is an accurate representation of the input, (ii) the distance between the first location and the second location.

In addition, the process 300 may include providing another text object for output at a third location on a proximity-sensitive display and determining a confidence value that reflects an input-to-text engine's confidence that text associated with the other text object accurately represents another input. In this way, the location and confidence values associated with hypothesized items presented on the proximity-sensitive display may impact a decision to select another hypothesized item.

In these examples, determining whether the touch received through the proximity-sensitive display represents a selection of the text based at least on (i) the confidence value that reflects the input-to-text engine's confidence that the text is an accurate representation of the input, (ii) the first location of the text object on the proximity-sensitive display, and (iii) the second location of the touch on the proximity-sensitive display, may include determining whether the touch received through the proximity-sensitive display represents a selection of the text based at least on (i) the confidence value that reflects the input-to-text engine's confidence that the text is an accurate representation of the input, (ii) the first location of the text object on the proximity-sensitive display, (iii) the second location of the touch on the proximity-sensitive display, (iv) the confidence value that reflects the input-to-text engine's confidence that the other text is an accurate representation of the other input, and (v) the third location of the other text object on the proximity-sensitive display.

At 350, the process 300 may include providing an indication of whether the touch received through the proximity-sensitive display represents a selection of the text. For example, this may be performed by user device 106 in its provision of list 132.

In some implementations, the process 300 may include receiving, by the text-to-input engine, input and generating, by the input-to-text engine, text based on the received input. In these implementations, the process may include determining a confidence value that reflects the input-to-text engine's confidence that the generated text accurately represents the received input.

In some implementations, the process of receiving, by the input-to-text engine, input may include receiving, by the input-to-text engine, at least one image of a document. In these implementations, the process of determining the confidence value that reflects the input-to-text engine's confidence that the generated text accurately represents the received input may include determining a confidence value that reflects the input-to-text engine's confidence that the generated text accurately represents one or more textual characters included in the document. The input-to-text engine in these implementations may, for example, correspond to an optical character recognition engine.

In some implementations, the process of receiving, by the input-to-text engine, input may include receiving, by the input-to-text engine, audio data that encodes an utterance. In these implementations, the process of determining the confidence value that reflects the input-to-text engine's confidence that the generated text accurately represents the received input may include determining a confidence value that reflects the input-to-text engine's confidence that the generated text accurately represents one or more terms spoken in the utterance. The input-to-text engine in these implementations may, for example, correspond to a speech recognition engine or automatic speech recognizer ("ASR").

In some implementations, the process of receiving, by the input-to-text engine, input may include receiving, by the input-to-text engine, text in a first language. In these implementations, the process of generating, by the input-to-text engine, text based on the received input may include generating, by the input-to-text engine, text in a second language based on the received text in the first language. Further, the process of determining the confidence value that reflects the input-to-text engine's confidence that the generated text accurately represents the received input may include determining a confidence value that reflects the input-to-text engine's confidence that the generated text is an accurate translation of the received text. The input-to-text engine in these implementations may, for example, correspond to a machine translation engine.

In some examples, the first location of the text object on the proximity-sensitive display corresponds to a location of the text object's centroid on the proximity-sensitive display. In other examples, the first location of the text object on the proximity-sensitive display corresponds to a location of a portion of the text object's bounding box on the proximity-sensitive display.

Figure 4A:
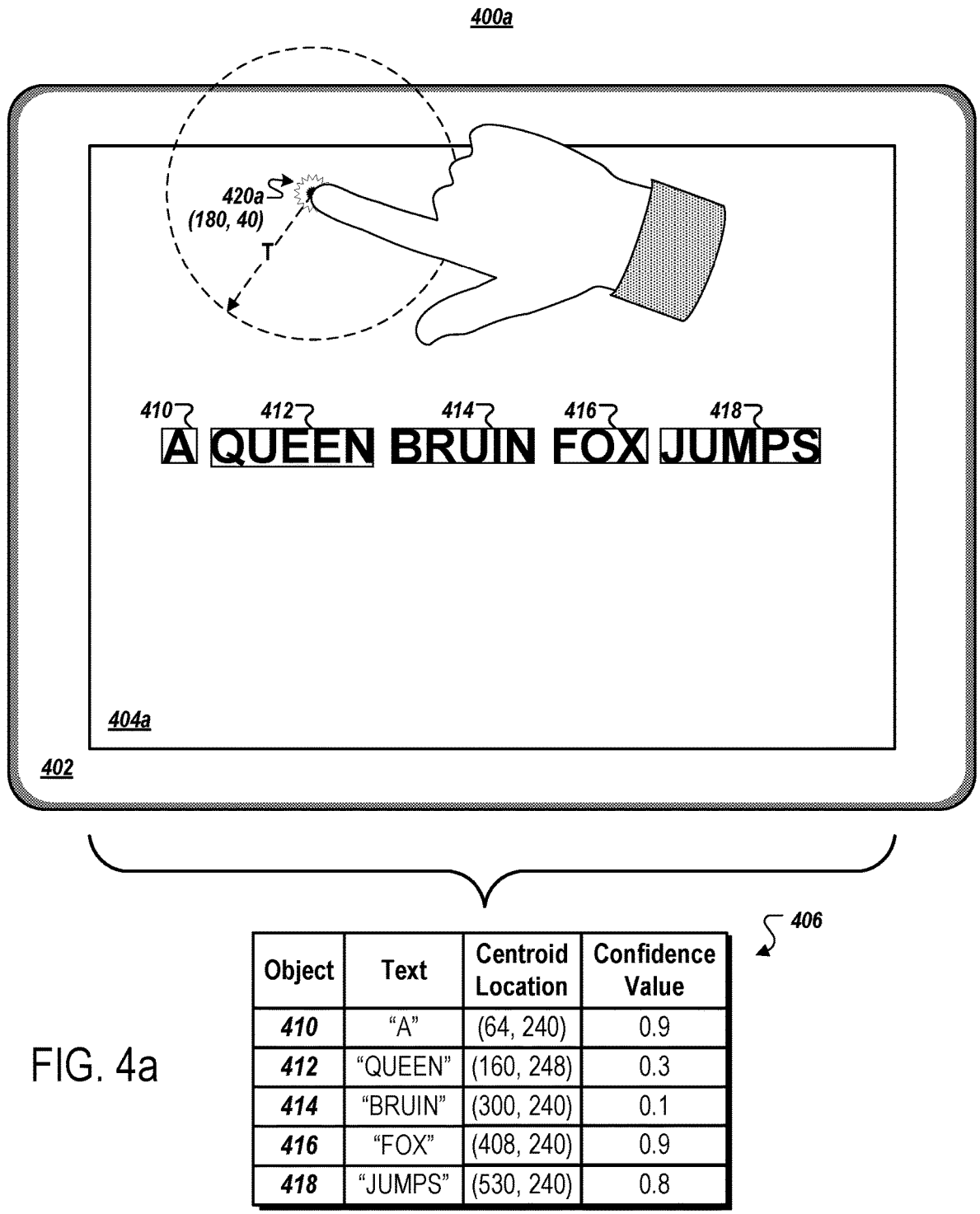
FIGS. 4a-c are conceptual diagrams of an exemplary framework for disambiguating touch selections of text on a proximity-sensitive display.

FIG. 4a is a conceptual diagram of an exemplary framework for disambiguating touch selections of text on a proximity-sensitive display in a system 400a. More particularly, the diagram depicts a computing device 402 that includes a proximity-sensitive display that presents screen 404a. The screen 404a may be an interface associated with an application running on computing device 402 that presents a plurality of hypothesized items. The diagram also includes a table 406 that indicates various parameters of each of the plurality of hypothesized items as displayed by the computing device 402.

In this example, the hypothesized items presented include text object 410 that is associated with the hypothesized word "A," text object 412 that is associated with the hypothesized word "QUEEN," text object 414 that is associated with the hypothesized word "BRUIN," text object 416 that is associated with the hypothesized word "FOX," and text object 418 that is associated with the hypothesized word "JUMPS."

These text objects may have been provided in association with a mapping engine, such as an input-to-text engine, that has mapped received input data to text output. The input-to-text engine responsible for text objects 410-418 may be similar to that which has been described above in reference to FIGS. 1-3. As such, the text objects 410-418 may, for example, represent results of a speech recognition process, gesture recognition process, optical character recognition process, machine translation process, and the like.

As illustrated by system 400a and conveyed by table 406, each of the text objects 410-418 are output at a different location on the proximity-sensitive display of computing device 402. These locations may, for example, be quantified or otherwise characterized using one or more coordinate systems.

In the example of table 406, the location of each of the text objects 410-418 may be characterized with Cartesian coordinates using a pixel coordinate system. Such a pixel coordinate system may, for instance, define origin of a rendered item at the upper-left corner of the display. In some implementations, the locations of items may be proximity-sensitive display of computing device 402 may be indicated using a polar coordinate system.

In addition, each of the text objects 410-418 may be spatially-defined by a bounding box or a box with the smallest measure within which all of the points of the object lie. The rectangles that outline each of the text objects 410-418 as depicted in FIG. 4a may represent each text object's respective bounding box. In the example of table 406, the location of each of the text objects 410-418 corresponds to the location of the centroid or geometric center of each respective object or bounding box. In some implementations, Barycentric location information may be determined for displayed items and considered relied upon in the processes described herein.

In some implementations, one or more locations along the perimeter of each bounding box may be utilized in place of or in addition to centroid locations for the determination processes described herein. For example, the disambiguation processes described in association with FIGS. 1-3 may utilize the location along the perimeter of a bounding box that is closest to the location at which touch input is received as the location on the proximity-sensitive display at which each item is located.

In the example depicted in FIG. 4a, the computing device 402 may receive data indicating a touch input 420a. For instance, touch input 420a may be provided by a user to a particular location on the proximity-sensitive display of the computing device 402. In this example, the location at which touch input 420a is provided may be characterized with the Cartesian pixel coordinates (180, 40).

Upon receiving data indicating touch input 420a, the computing device 402 may determine whether the touch input 420a received through the proximity-sensitive display represents a selection of text associated with one or more of the text objects 410-418. In some implementations, the computing device 402 may initially determine which, if any, of the text objects 410-418 are within a threshold distance "T" from the location of the touch input 420a. As described above in reference to FIG. 2, a disambiguation module may, for instance, carry out one or more of these processes using location information for the text objects 410-418 and location information for the touch input 420a.

If, for example, the computing device 402 determines that the distance between the touch input 420a and a hypothesized item that it is displaying is greater than threshold distance T, then the computing device 402 may exclude that particular hypothesized item from selection consideration. In some implementations, confidence value information for a hypothesized item may only be referenced or considered if the hypothesized item is less than the threshold distance T from the touch input 420a. The distances computed and relied upon by computing device 402 may, for example, be Euclidian distances.

In this example, the computing device 402 may determine that all of the text objects 410-418 exceed the distance threshold T, and thus determine that the touch input 420a received through the proximity-sensitive display does not represent a selection of any of text objects 410-418. Indication of this determination may, for instance, be communicated to one or more components of computing device 402 as described herein. In some examples, this indication is further provided to one or more other devices in communication with computing device 402 and/or conveyed to a user of computing device 402.

In some examples, the threshold distance T may be based on one or more of the size and resolution of the computing device's display. In this way, selection disambiguation criteria may be tailored to the particular device being used. For example, the threshold distance T utilized by computing device 402 that is a tablet device may be substantially greater than the threshold distance T utilized by a computing device 402 that is a wearable wrist-watch device. In some implementations, selection scores may be determined for all displayed items regardless of their distance from touch input 420a. In these implementations, the selection scores may be compared to one or more thresholds in order to determine which, if any, of the displayed items may be selected.

Figure 4B:
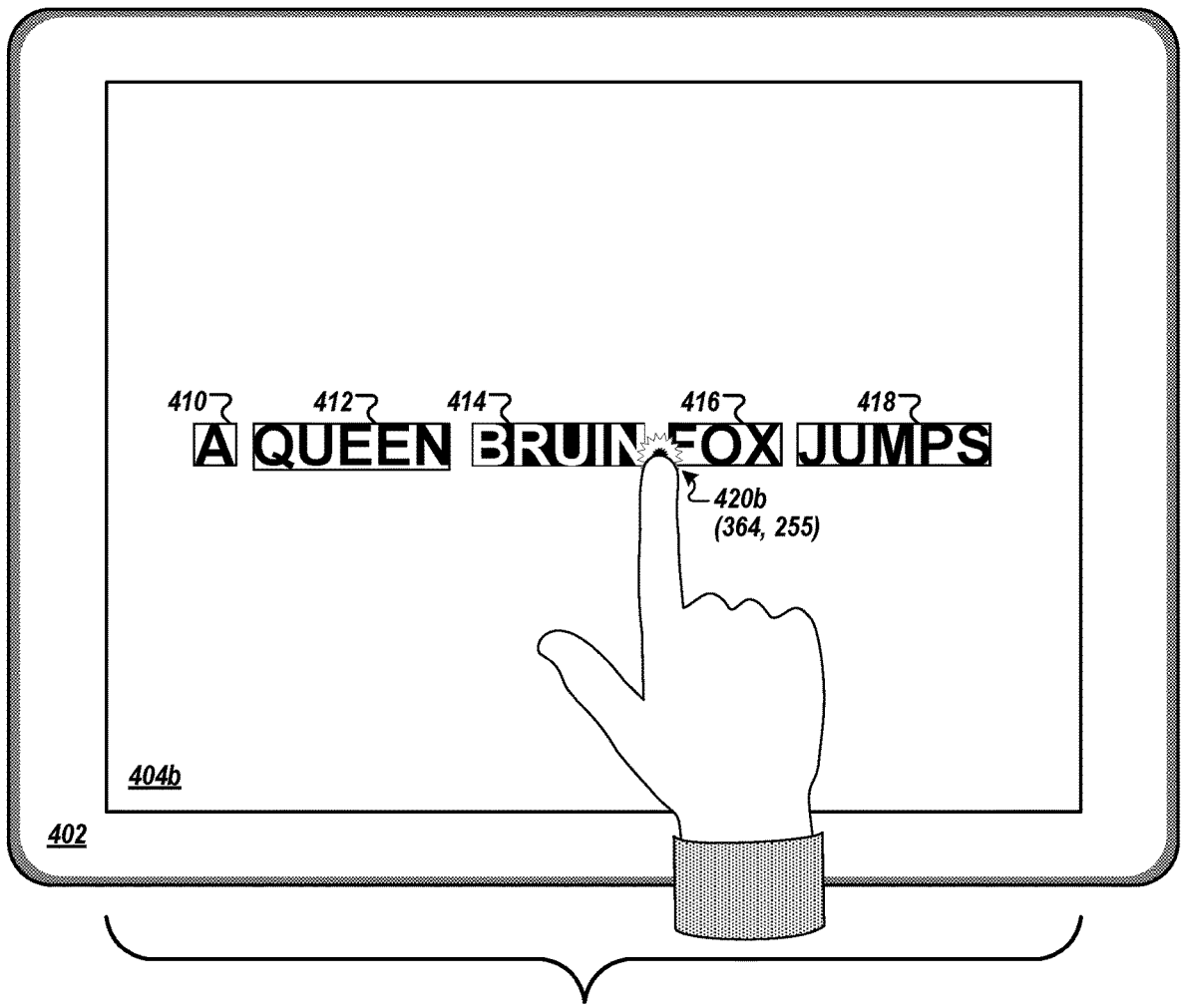

FIG. 4b is a conceptual diagram of an exemplary framework for disambiguating touch selections of text on a proximity-sensitive display in a system 400b. More particularly, the diagram depicts computing device 402 that includes a proximity-sensitive display that presents screen 404b. The computing device 402, table 406, and text objects 410-418 of system 400b may be the same as or substantially similar to those which have been described above in reference to system 400a of FIG. 4a.

In the example depicted in FIG. 4b, the computing device 402 may receive data indicating a touch input 420b. For instance, touch input 420b may be provided by a user to a particular location on the proximity-sensitive display of the computing device 402. In this example, the location at which touch input 420b is provided may be characterized with the Cartesian pixel coordinates (364, 255).

Upon receiving data indicating touch input 420b, the computing device 402 may determine whether the touch input 420b received through the proximity-sensitive display represents a selection of text associated with one or more of the text objects 410-418. As described above, this may include evaluating distances between the location of the touch input 420b and the locations of the text objects 410-418 against one or more thresholds.

In this example, the computing device 402b may determine that text objects 414 and 416, as indicated in table 406, are associated with locations (300, 240) and (408, 240), respectively, and optionally that they fall within a threshold distance. The computing device 404 may, for example, determine that the distance between the location at which touch input 420 was received and text object 416 is ~71% of the distance between the location at which touch input 420 was received and text object 414. As such, a selection score determined for text object 416 may be more favorably influenced by distance than that of a selection score determined for text object 414.

The computing device 402 may determine a confidence value that reflects the input-to-text engine's confidence that the word "BRUIN" associated with text object 414 accurately represents a respective input, as well was a confidence value that reflects the input-to-text engine's confidence that the word "FOX" associated with text object 416 accurately represents a respective input. As indicated in table 406, the confidence values for text objects 414 and 416 may be 0.1 and 0.9, respectively.

In an example in which the input-to-text engine of FIG. 4b is a speech recognition engine, the word "BRUIN" associated with text object 414 may correspond to input data that indicates an utterance of the word "BROWN." However, the corresponding utterance may have exhibited one or more acoustical characteristics that more closely align with the word "BRUIN." This may, for instance, at least partially account for the relatively low confidence value determined for this hypothesized item, as one or more language models associated with a speech recognizer may consider "BRUIN" to be an unlikely fit within the phrase of text associated with text objects 410-418.

As conveyed by its confidence value, it can be noted that the input-to-text engine is relatively confident that the word "FOX" is an accurate representation of corresponding input data received by the input-to-text engine. In contrast, it can be noted that the input-to-text engine is relatively unconfident that the word "BRUIN" is an accurate representation of corresponding input data received by the input-to-text engine. As such, the computing device 402 may determine that the input-to-text engine's confidence in the text object 414 is ~11% lower than its confidence in the text object 416.

Under an assumption that selection scores are equally weighted by distance and confidence value, it can be seen that text object 414 may be chosen over text object 416 when disambiguating a selection associated with touch input 420b. Accordingly, computing device 402 may determine that touch input 420b received through its proximity-sensitive display represents a selection of the text "BRUIN" that is associated with text object 414. In response to this determination, one or more indications that the touch input 420b represents a selection of "BRUIN" may be provided. As illustrated in FIG. 4b, "BRUIN" may, for example, be highlighted to indicate such selection.

In some examples, the weighting that distance and confidence value provide in these determinations may not be equal. In some examples, these weightings may be based on one or more of the size and resolution of the computing device's display. For example, it may be desirable to have distance exert less of an influence in selection disambiguation determinations that are performed for devices with relatively small displays. This might be desirable in that it may be easier to make location-based errors when providing touch input to a small interface.

On the contrary, it may be desirable to have distance exert substantial influence in selection disambiguation determinations that are performed for devices with relatively large displays. This might be desirable in that it may location-based errors may be more easily avoided when providing touch input to a large interface. In this way, selection disambiguation criteria may be tailored to the particular device being used.

In some examples, one of the values that may be considered in determining a selection score for a text object may be one that is inversely proportional to the square of the distance from the text object to the touch input. Such a value may be relied upon in disambiguation selection processes in place of or in addition to distance values.

Figure 4C:
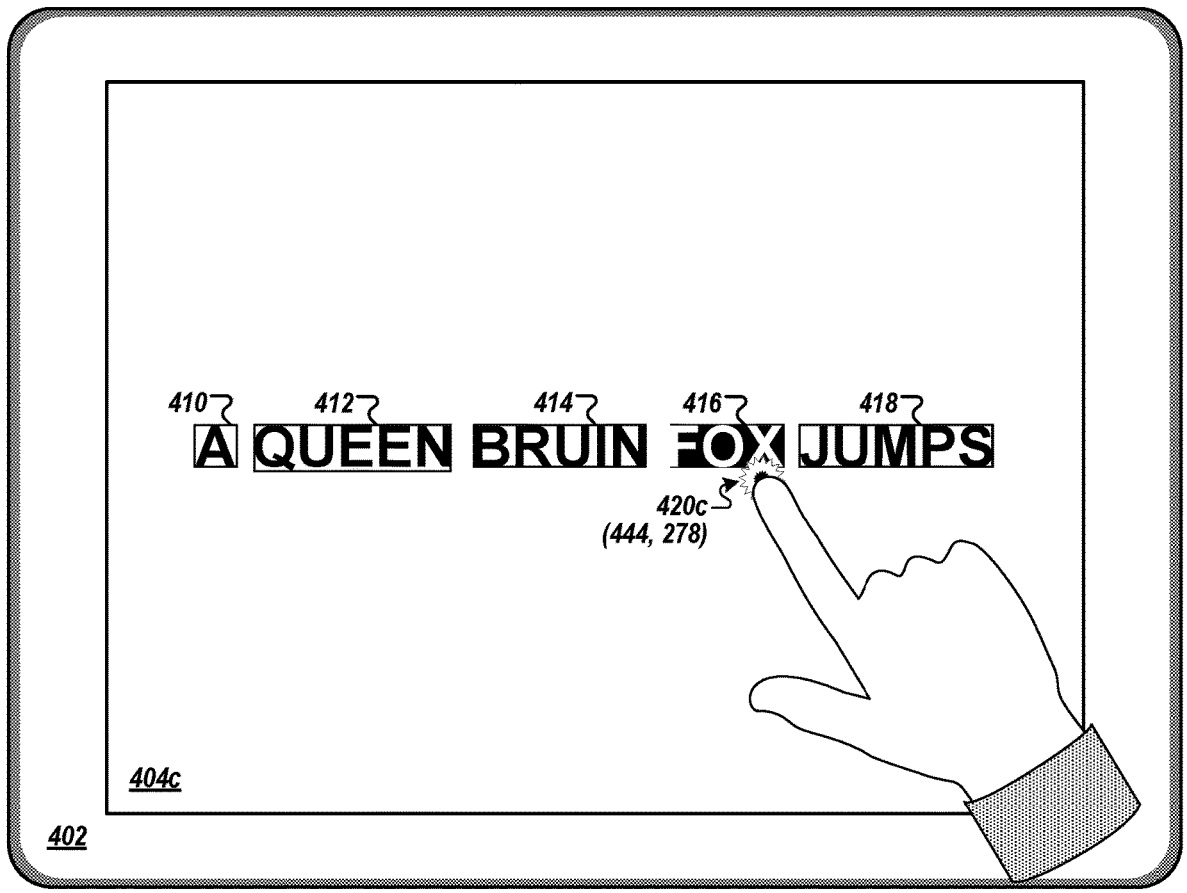

FIG. 4c is a conceptual diagram of an exemplary framework for disambiguating touch selections of text on a proximity-sensitive display in a system 400c. More particularly, the diagram depicts computing device 402 that includes a proximity-sensitive display that presents screen 404c. The computing device 402, table 406, and text objects 410-418 of system 400c may be the same as or substantially similar to those which have been described above in reference to systems 400a and 400b of FIGS. 4a and 4b, respectively.

In the example depicted in FIG. 4bc, the computing device 402 may receive data indicating a touch input 420c. For instance, touch input 420c may be provided by a user to a particular location on the proximity-sensitive display of the computing device 402. In this example, the location at which touch input 420*c* is provided may be characterized with the Cartesian pixel coordinates (444, 278).

Upon receiving data indicating touch input 420*c*, the computing device 402 may determine whether the touch input 420*c* received through the proximity-sensitive display represents a selection of text associated with one or more of the text objects 410-418. As described above, this may include evaluating distances between the location of the touch input 420*b* and the locations of the text objects 410-418 against one or more thresholds.

In this example, the computing device 402 may determine that the touch input 420*c* received through the proximity-sensitive display of computing device 402 represents a selection of the text "FOX" that is associated with text object 416. In contrast to the example of FIG. 4*b*, the touch input 420*c* was provided close enough to the location of text object 416 so as to overcome the input-to-text engine's relatively high level of confidence in the word "FOX" accurately representing a respective input. In response to this determination, one or more indications that the touch input 420*c* represents a selection of "FOX" may be provided.

As illustrated in FIG. 4*c*, "FOX" may, for example, be highlighted to indicate such selection. Similarly, one or more indications that the touch input 420*c* does not represent a selection of "A," "QUEEN," "BRUIN," and/or "JUMPS" may also be provided to one or more components of computing device 402 as described herein. In some examples, some or all of the described indications may be further provided to one or more other devices in communication with computing device 402 and/or conveyed to a user of computing device 402.

In some implementations, multiple hypothesized items may be considered for selection. That is, it may be determined that touch received through a proximity-sensitive display represents a selection of multiple hypothesized items. In a speech recognition example, this feature may be useful to select entire phrases of words that have been incorrectly transcribed by an ASR.

In these implementations, selection disambiguation determination processes may additionally consider confidence values and location information for groups of adjacent hypothesized items that are displayed. Such confidence values, which reflect a mapping engine's confidence that a group of items is an accurate representation of one or more corresponding portions of input data, may be provided directly from the mapping engine to the disambiguation module. In some examples, such group confidence values may be determined by averaging the confidence values for each item in the proposed group.

In some implementations, the disambiguation module may determine to expand a selection outwards to include additional adjacent items that are associated with relatively low confidence values. This selection may, for instance, extend linearly outwards from a primeval item to include items located between the primeval item and one or more items having confidence values that exceed a threshold.

As described above, a user may be provided with an opportunity to change or otherwise modify selected items. For example, a pop-up or drop-down menu that indicates alterative hypothesized items may be provided in response to determining that touch input received through a proximity-sensitive display represents a selection of a particular item. In these examples, additional input may be provided by a user to select an alternative item. In examples where, following selection, an item is replaced with another item, confidence values and location information that correspond to the newly displayed item may be provided. The new confidence value provided may, for example, be relatively high given that the user manually-selected it in a corrective process.

Although examples described above include biasing selection toward hypothesized items that are associated with relatively low confidence values, it is to be understood that, in some implementations, selection disambiguation determination processes may include biasing selection toward hypothesized items that are associated with relatively high confidence values. For example, multiple hypothesized items that are displayed may each represent different recommendations that are being provided as options a user. In this example, it may be desirable to bias selection toward recommended items that a recommender engine is relatively confident represent interests of the user, which may likely be selected.

In some implementations, the selection disambiguation techniques described herein may be utilized in devices having a heads-up display or an optical head-mounted display. With such devices, a user may be able to select or otherwise interact with items that are presented as part of an augmented reality system or a virtual reality system through the use of one or more gestures. For instance, a user may be able to interact with items presented by such displays by making hand gestures in three-dimensional space.

The user may, for example, select or interact with displayed items by reaching out and establishing virtual contact with them. In some implementations, data that indicates one or more gestures performed in the presence of the device may be considered in place of the touch input described herein. In such implementations, the locations of hypothesized items and gesture inputs may be characterized and considered in three dimensions.

By applying techniques described herein, a computing device may provide, using a heads-up or optical head-mounted display, an item at a first location in computer-mediated reality, receive data indicating that a particular gesture has been performed at a location that corresponds to a second location in the in computer-mediated reality, determine a confidence value the reflects a mapping engine's confidence that the item accurately represents an input, determine whether the gesture represents a selection of the item based at least on (i) the confidence value that reflects the mapping engine's confidence that the item is an accurate representation of the input, (ii) the first location, and (iii) the second location, and provide an indication of whether the gesture represents a selection of or interaction with the item.

It is to be understood that, in these implementations, the mapping engine may be implemented as described above. In particular, implementations in which an image recognition engine is utilized as the mapping engine may be useful in heads-up and optical head-mounted display systems that augment a user's reality with items that are generated as a result of one or more image recognition processes.

Figure 5:
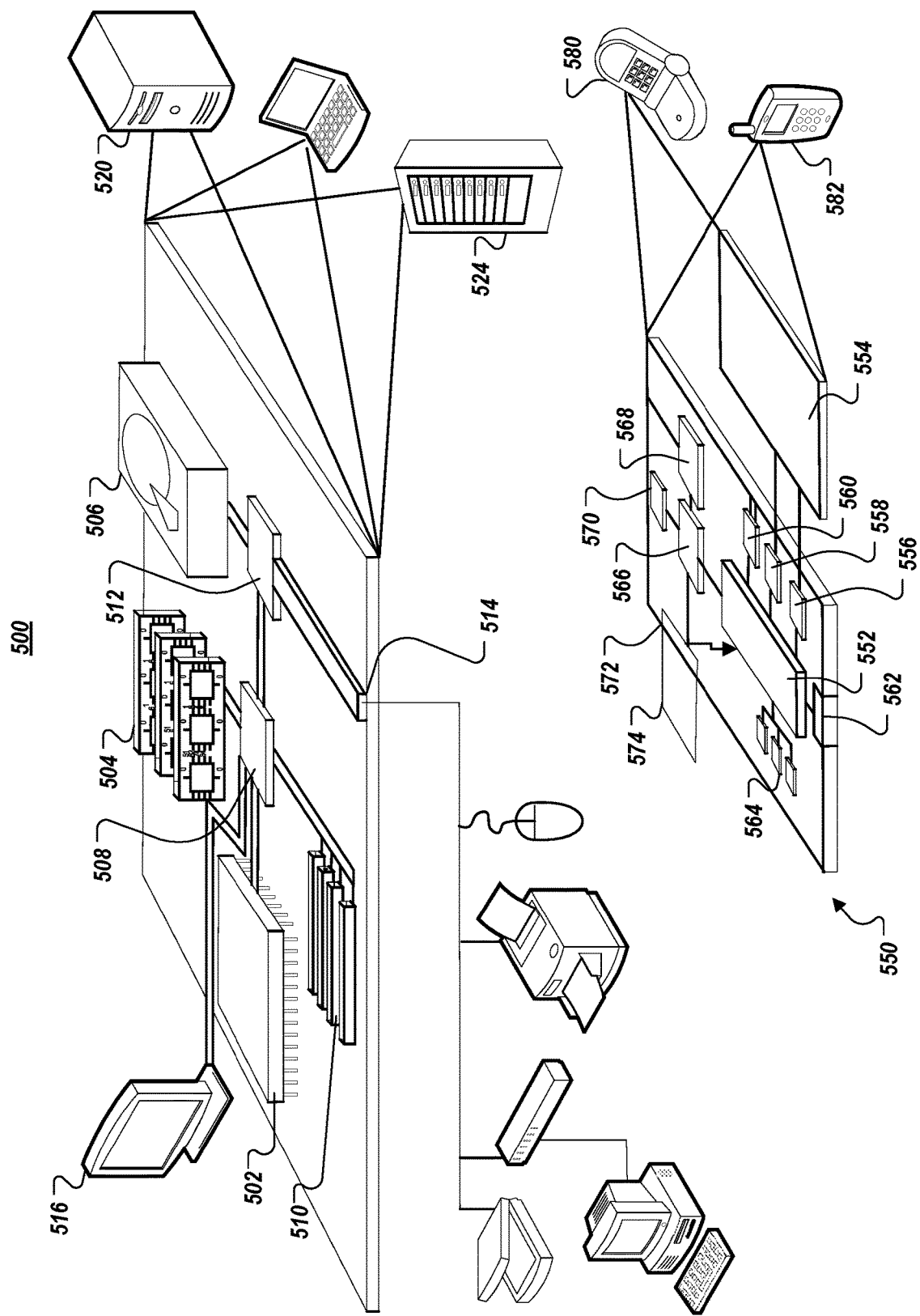
FIG. 5 is a diagram of exemplary computing devices.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate.

The processor 502 can process instructions for execution within the computing device 500, including instructions stored in the memory 504 or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations, e.g., as a server bank, a group of blade servers, or a multi-processor system.

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices, for example, processor 502, perform one or more methods, such as those described above. The instructions can also be stored by one or more storage devices such as computer- or machine-readable mediums, for example, the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516, e.g., through a graphics processor or accelerator, and to the high-speed expansion ports 510, which may accept various expansion cards (not shown).

In the implementation, the low-speed interface 512 is coupled to the storage device 506 and the low-speed expansion port 514. The low-speed expansion port 514, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524.

Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552.

In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550.

Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices, for example, processor 552, perform one or more methods, such as those described above. The instructions can also be stored by one or more storage devices, such as one or more computer- or machine-readable mediums, for example, the memory 564, the expansion memory 574, or memory on the processor 552. In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others.

Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound, e.g., voice messages, music files, etc., and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus.

Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system.

A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A method comprising:
   receiving, at a user device, audio data corresponding to an utterance spoken by a user of the user device;
   processing, by the user device, the audio data to generate a transcription of the utterance, the transcription comprising a plurality of words, each word of the plurality of words in the transcription comprising a respective confidence value indicating a likelihood that the corresponding word is correct;
   displaying, by the user device, the transcription of the utterance on a proximity-sensitive display of the user device, each word of the plurality of words in the transcription comprising a word location on the proximity-sensitive display;
   receiving, at the user device, data indicating a touch received on the proximity-sensitive display, the data comprising a touch location on the proximity-sensitive display;
   for each word of the plurality of words in the transcription, determining, by the user device, a respective distance between the word location of the corresponding word and the touch location of the received touch;
   selecting, by the user device, a first word of the plurality of words in the transcription displayed on the proximity-sensitive display based on the respective confidence value of each word of the plurality of words and the respective distance between the word location of each word of the plurality of words and the touch location, wherein a first distance between a first word location of the selected first word and the touch location being greater than a second distance between a second word location of a corresponding second word and the touch location; and
   augmenting, by the user device, the selected first word of the plurality of words in the transcription displayed on the proximity-sensitive display.

2. The method of claim 1, wherein processing the audio data to generate the transcription of the utterance comprises executing a speech recognizer on the user device, the speech recognizer configured to:
   generate a word lattice for the utterance; and
   generate the transcription of the utterance based on the word lattice.

3. The method of claim 2, wherein the word lattice comprises multiple hypotheses for the transcription of the utterance.

4. The method of claim 1, further comprising, when the respective distance between the word location of the corresponding word and the touch location of the received touch satisfies a threshold distance, excluding, by the user device, the corresponding word from consideration as the selected first word of the plurality of words in the transcription displayed on the proximity-sensitive display.

5. The method of claim 4, wherein the threshold distance is based on a size and resolution of the proximity-sensitive display.

6. The method of claim 1, wherein the word location of each word in the transcription is displayed on the proximity-sensitive display and corresponds to a respective location of a centroid of the corresponding word displayed on the proximity-sensitive display.

7. The method of claim 1, wherein augmenting the selected first word of the plurality of words in the transcription displayed on the proximity-sensitive display comprises highlighting the selected first word of the plurality of words.

8. The method of claim 1, wherein augmenting the selected first word of the plurality of words in the transcription displayed on the proximity-sensitive display comprises superimposing a menu of alternative hypothesized words.

9. The method of claim 8, further comprising:
receiving, at the user device, a user input indication indicating selection of an alternative hypothesized word in the menu of alternative hypothesized words; and
replacing, by the user device, the selected first word of the plurality of words in the transcription displayed on the proximity-sensitive display with the selected alternative hypothesized word.

10. A user device comprising:
data processing hardware; and
memory hardware in communication with the data processing hardware and storing instructions, that when executed by the data processing hardware, cause the data processing hardware to perform one or more operations comprising:
receiving audio data corresponding to an utterance spoken by a user of the user device;
processing the audio data to generate a transcription of the utterance, the transcription comprising a plurality of words, each word of the plurality of words in the transcription comprising a respective confidence value indicating a likelihood that the corresponding word is correct;
displaying the transcription of the utterance on a proximity-sensitive display of the user device, each word of the plurality of words in the transcription comprising a word location on the proximity-sensitive display;
receiving data indicating a touch received on the proximity-sensitive display, the data comprising a touch location on the proximity-sensitive display;
for each word of the plurality of words in the transcription, determining a respective distance between the word location of the corresponding word and the touch location of the received touch;
selecting a first word of the plurality of words in the transcription displayed on the proximity-sensitive display based on the respective confidence value of each word of the plurality of words and the respective distance between the word location of each word of the plurality of words and the touch location, wherein a first distance between a first word location of the selected first word and the touch location being greater than a second distance between a second word location of a corresponding second word and the touch location; and
augmenting the selected first word of the plurality of words in the transcription displayed on the proximity-sensitive display.

11. The user device of claim 10, wherein processing the audio data to generate the transcription of the utterance comprises executing a speech recognizer on the user device, the speech recognizer configured to:
generate a word lattice for the utterance; and
generate the transcription of the utterance based on the word lattice.

12. The user device of claim 11, wherein the word lattice comprises multiple hypotheses for the transcription of the utterance.

13. The user device of claim 10, wherein the operations further comprise, when the respective distance between the word location of the corresponding word and the touch location of the received touch satisfies a threshold distance, excluding the corresponding word from consideration as the selected first word of the plurality of words in the transcription displayed on the proximity-sensitive display.

14. The user device of claim 13, wherein the threshold distance is based on a size and resolution of the proximity-sensitive display.

15. The user device of claim 10, wherein the word location of each word in the transcription is displayed on the proximity-sensitive display and corresponds to a respective location of a centroid of the corresponding word displayed on the proximity-sensitive display.

16. The user device of claim 10, wherein augmenting the selected first word of the plurality of words in the transcription displayed on the proximity-sensitive display comprises highlighting the selected first word of the plurality of words.

17. The user device of claim 10, wherein augmenting the selected first word of the plurality of words in the transcription displayed on the proximity-sensitive display comprises superimposing a menu of alternative hypothesized words.

18. The user device of claim 17, wherein the operations further comprise:
receiving a user input indication indicating selection of an alternative hypothesized word in the menu of alternative hypothesized words; and
replacing the selected first word of the plurality of words in the transcription displayed on the proximity-sensitive display with the selected alternative hypothesized word.

* * * * *